US011332236B2

(12) United States Patent
Cox et al.

(10) Patent No.: US 11,332,236 B2
(45) Date of Patent: May 17, 2022

(54) FORCE LIMITING SYSTEM AND METHOD FOR LIMITING LOADS IN A POWERED AIRCRAFT LANDING GEAR DRIVE WHEEL

(71) Applicant: Borealis Technical Limited, North Plains, OR (US)

(72) Inventors: Isaiah W. Cox, London (GB); Joseph J. Cox, Portland, OR (US); Yonatan Rotenberg, Miami, FL (US)

(73) Assignee: Borealis Technical Limited, Isle of Man (IM)

( * ) Notice: Subject to any disclaimer, the term of this patent is extended or adjusted under 35 U.S.C. 154(b) by 590 days.

(21) Appl. No.: 15/991,758

(22) Filed: May 29, 2018

(65) Prior Publication Data

US 2018/0339767 A1 Nov. 29, 2018

Related U.S. Application Data

(60) Provisional application No. 62/512,007, filed on May 27, 2017.

(51) Int. Cl.
*B64C 25/40* (2006.01)
*B60B 27/00* (2006.01)
(Continued)

(52) U.S. Cl.
CPC ........ *B64C 25/405* (2013.01); *B60B 27/0021* (2013.01); *F16D 9/06* (2013.01); *F16D 11/00* (2013.01); *F16D 41/125* (2013.01)

(58) Field of Classification Search
CPC ................................ B64C 25/405; F16D 9/06
See application file for complete search history.

(56) References Cited

U.S. PATENT DOCUMENTS 6,402,469 B1 * 6/2002 Kastl ..................... F01D 21/045
416/2
6,578,786 B2 * 6/2003 Kajiyama ........... B60R 22/4676
242/379.1

(Continued)

FOREIGN PATENT DOCUMENTS

EP 2055973 A2 5/2009

OTHER PUBLICATIONS

Examination Report under Section 18(3) in GB1809333.6 (UK Intellectual Property Office; dated Nov. 29, 2018).

(Continued)

*Primary Examiner* — Brian M O'Hara
*Assistant Examiner* — Michael B. Kreiner

(57) ABSTRACT

A force limiting system and method are provided for limiting loads in aircraft nose or main landing gear having wheels powered by taxi drive systems mounted within the landing gear wheels to drive aircraft on the ground. The force limiting system may include mechanical components selected to limit or minimize spin-up mass and to releasably connect the taxi drive system to a landing gear wheel section so that operation of the taxi drive system to drive a landing gear wheel is prevented in the presence of a predetermined maximum load. The load limiting system employs mechanical components engineered to securely connect the taxi drive system to the landing gear wheel during operation and to release the taxi drive system from connection to the wheel when loads applied to system components exceed an established or recommended maximum load.

14 Claims, 5 Drawing Sheets

(51) Int. Cl.
  *F16D 41/12* (2006.01)
  *F16D 11/00* (2006.01)
  *F16D 9/06* (2006.01)

(56) References Cited

U.S. PATENT DOCUMENTS

| | | | | |
|---|---|---|---|---|
| 7,025,560 | B2* | 4/2006 | Clark | F01D 21/04 |
| | | | | 403/2 |
| 7,078,112 | B2* | 7/2006 | Suzuki | B22F 5/00 |
| | | | | 428/304.4 |
| 7,303,477 | B2* | 12/2007 | Son | B01J 29/80 |
| | | | | 464/32 |
| 8,122,781 | B2* | 2/2012 | Minke | F16D 9/06 |
| | | | | 74/405 |
| 8,152,099 | B2 | 4/2012 | Wilson | |
| 9,302,541 | B2 | 4/2016 | Edelson | |
| 9,567,069 | B2 | 2/2017 | Cox | |
| 10,118,691 | B2* | 11/2018 | Cox | B60K 7/0007 |
| 10,138,946 | B2* | 11/2018 | Harrison | F01D 5/027 |
| 10,759,518 | B2* | 9/2020 | Fages | F16H 35/10 |
| 2013/0277164 | A1* | 10/2013 | Prout | F16D 11/14 |
| | | | | 192/69.9 |
| 2014/0205374 | A1* | 7/2014 | Nias | F16D 7/021 |
| | | | | 403/367 |
| 2016/0185452 | A1 | 6/2016 | Cox et al. | |
| 2017/0021921 | A1* | 1/2017 | Cox | B64C 25/405 |
| 2018/0058510 | A1 | 3/2018 | Jaber et al. | |

OTHER PUBLICATIONS

Search Report under Section 17 in GB1809333.6 (UK Intellectual Property Office; dated Nov. 28, 2018).
14 CFR 23.725-23.726.
"Boeing 737 Series Towing" 09-5(http://nata_aero/agso/ASTGCache/1196184a-7ddf-4149-9a23-1017e129287c.pdf).
14 CFR Appendix D to Part 23.

\* cited by examiner

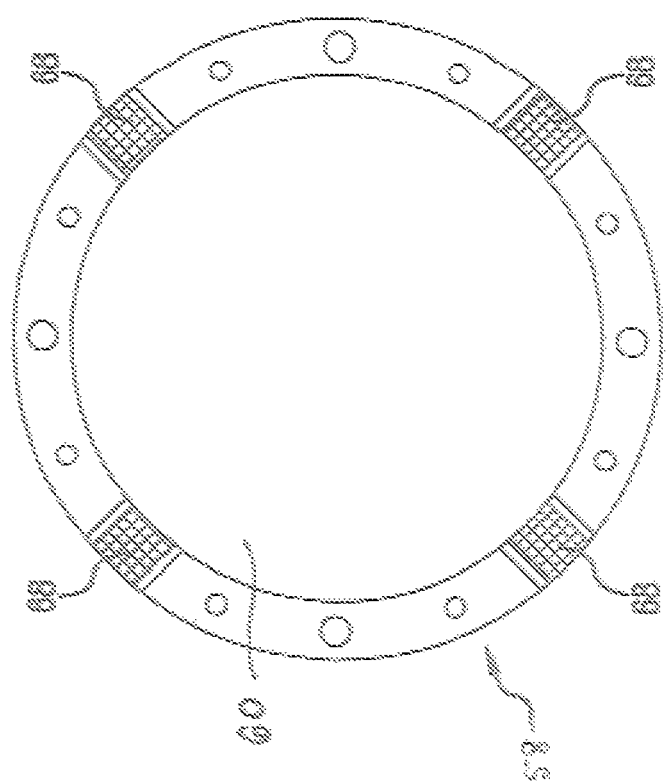
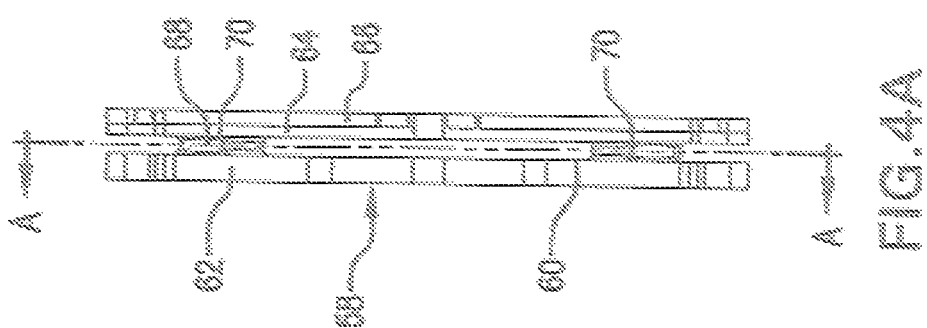

| | |
|---|---|
| $U$ | velocity in the $x$ direction of the aircraft |
| $W$ | velocity in the $z$ direction of the aircraft |
| $Q$ | angular velocity about the CG of the aircraft |
| $\theta$ | pitch angle about the CG of the aircraft |
| $X_{cg}$ | longitudinal position/displacement in the horizontal direction of the CG of the aircraft |
| $H_{cg}$ | vertical position of the CG of the aircraft measured from the ground in the vertical direction |
| $Z_{gm}$ | perpendicular distance between the main wheel hub center and the $x$ axis |
| $Z_{gn}$ | perpendicular distance between the main wheel hub center and the $x$ axis |
| $h_m$ | main hub height relative to the ground |
| $h_n$ | nose hub height relative to the ground |
| $X_m$ | main hub displacement in the $X$ direction |
| $X_n$ | nose hub displacement in the $X$ direction |

FIG.6A  A set of kinematic variables describing the entire mechanical system

| | |
|---|---|
| $X_{gn}$ | Free-body diagram force related to the action/reaction at the connection between the nose landing gear and its wheel hub and applied there in the $x$ direction |
| $X_{gm}$ | Free-body diagram force related to the action/reaction at the connection between the main landing gear and its wheel hub and applied there in the $x$ direction |
| $Z_{gn}$ | In Figure 5A, this is the reaction to the nose landing gear force $F_{gn}$; it is applied in the $z$ direction at the hub of the nose landing gear |
| $Z_{gm}$ | In Figure 5A, this is the reaction to the nose landing gear force $F_{gm}$; it is applied in the $z$ direction at the hub of the main landing gear |
| $T$ | Thrust force in the $x$ direction |
| $L$ | Lifting force |
| $D$ | Drag force |
| $M_a$ | Aerodynamic moment |
| $mg$ | Weight of the aircraft |

FIG.6B  Force definitions.

FORCE LIMITING SYSTEM AND METHOD FOR LIMITING LOADS IN A POWERED AIRCRAFT LANDING GEAR DRIVE WHEEL

PRIORITY CLAIM

This application claims priority from United States Provisional Patent Application No. 62/512,007, filed 27 May 2017, the disclosure of which is fully incorporated herein.

TECHNICAL FIELD

The present invention relates generally to structures and methods for limiting loads and forces on aircraft wheels and specifically to a force limiting system and method that limits excessive force application while providing a low spin-up mass in a powered aircraft drive wheel.

BACKGROUND OF THE INVENTION

A range of systems for driving aircraft wheels to move aircraft on the ground without reliance on or operation of aircraft engines and external tow vehicles have been proposed. Some of the proposed aircraft wheel drive systems use electric or other drive motors mounted within nose or main landing gear wheels to provide torque to move the aircraft wheels at taxi speeds. Adding additional rotating mass to an aircraft wheel, such as a wheel-mounted drive motor, may increase spin-up loads beyond desirable, or permissible, levels. When aircraft wheels become heavier, adverse effects from the shock, strength, and fatigue loads that may be produced may extend through the entire landing gear and into the aircraft fuselage. As additional mass is located closer to the rim of an aircraft wheel, the spin-up loads tend to increase.

The United States Federal Aviation Administration (FAA) and corresponding international authorities address aircraft wheel spin-up loads, as well as drag force and spring-back loads, in their design parameter regulations. (For example, 14 Code of Federal Regulations 1(C), Part 23 & App. D to Part 23) It is noted that dynamic spring-back is likely to become critical for landing gear units having wheels of large mass or high landing speeds.

Aircraft manufacturers may limit other loads on aircraft landing gear and landing gear wheels that will produce damage if exceeded. For example, maximum towing loads on nose and main landing gear are identified in FIG. 09-5 in the Boeing publication entitled "Boeing 737-Series Towing." (See nata.aero/agso/ASTGCache/1196184a-7ddf-4149-9a23-107e129287c.pdf) FAA certification of landing gear structures requires not exceeding these maximum towing loads.

When an aircraft, which may be equipped with two or more sets of main landing gears and a nose landing gear, each supporting one or more wheels, lands on a ground surface, the main landing gear wheels will contact the surface before the nose landing gear wheels. During spin-up after landing, vertical ground-to-wheel loads will increase as the aircraft's vertical momentum decreases, while horizontal drag loads increase as the landing gear wheels rotate and tires mounted on the wheels contact the ground surface. Spring-back, which results from resilience in landing gear structures and the landing gear wheels, may follow a spin-up period. The extent of traction and slip between tires mounted on the landing gear wheels and the runway or other ground surface usually differs during spin-up and spring-back and may have an effect on the vertical or horizontal loads on landing gear wheels, tires, and other landing gear structures.

Engines-off taxi systems, electric or E-taxi systems, and other taxi drive systems mounted on or within aircraft landing gear wheels to drive the wheels and the aircraft during ground travel add mass to the landing gear wheels in which they are mounted. Designing such taxi drive systems to avoid increasing spin-up loads and other loads on aircraft landing gear and additional aircraft structures presents challenges. It is particularly desirable when retrofitting these taxi drive systems into landing gear wheels to avoid increasing the spin-up loads or rotating mass over that of the aircraft's original wheels. It is also desirable to select components for electric taxi and other taxi drive systems that are designed to minimize any spin-up mass added to the taxi drive system and, therefore, the landing gear wheel. A taxi drive system should, in addition, be designed to ensure that landing gear wheel spin-up loads may be limited so that these loads do not exceed recommended maximum landing or taxi spin-up loads.

Taxi drive system components, particularly clutches, may add mass that could adversely affect spin-up loads. Commonly owned U.S. Pat. No. 9,302,541 to Edelson and U.S. Pat. No. 9,567,069 to Cox and U.S. Patent Application Publication No. US 2016/0185452 to Cox et al. describe clutch assemblies useful with electric and other taxi drive systems to drive landing gear wheels. Incorporating these clutch assemblies into taxi drive systems to limit the landing gear wheel spin-up mass or spin-up loads is not suggested.

Reducing or delaying the start of the spin-up of aircraft wheels upon landing of the aircraft is described in U.S. Pat. No. 8,152,099 to Wilson. This is accomplished by applying a braking force immediately after, or even before, the aircraft wheels touch the runway, which has the effect of decoupling or separating vertical wheel-to-ground loads and horizontal drag loads and reducing the maximum load produced by the combination of the vertical loads and the drag loads on the aircraft during landing. Wilson does not suggest that this method or the apparatus disclosed for conducting the method, which may be most effective in a trailing link type of landing gear, would be useful in an aircraft with a powered electric or other taxi drive system mounted within one or more landing gear wheels.

A force limiting system and method for aircraft landing gear wheel taxi drive systems is needed that minimizes any added spin-up mass and avoids increasing loads and forces on the landing gear and, in particular, does not increase spin-up loads beyond the recommended or established maximum spin-up loads for the aircraft landing gear's legacy wheels. A taxi drive system with force limiting structural components that respond to landing gear wheel spin-up and other loads that may be in excess of recommended maximum landing or taxi spin-up loads and to other forces on landing gear to limit these loads and forces is also needed.

SUMMARY OF THE INVENTION

It is a primary object of the present invention, therefore, to provide a force limiting system and method for aircraft landing gear wheel taxi drive systems that avoids increasing spin-up loads beyond the recommended or established maximum spin-up loads for the aircraft landing gear's legacy wheels with taxi drive system components selected to minimize any added spin-up mass and limit landing gear wheel spin-up loads and other forces on landing gear to recommended maximums for the spin-up loads and other forces.

It is another object of the present invention to provide a force limiting system for an aircraft landing gear wheel taxi drive system that may be mounted within one or more nose or main landing gear wheels and has one or more mechanical components that do not add significantly to the spin-up mass.

It is a further object of the present invention to provide force limiting structure within an aircraft landing gear wheel taxi drive system that is specifically designed to limit spin-up loads to established maximum landing spin-up loads for the aircraft landing gear.

It is yet another object of the present invention to provide a force limiting system with a mechanical component that releasably connects an aircraft taxi drive system to the aircraft landing gear wheel in which the taxi drive system is mounted and disconnects the taxi drive system from the landing gear wheel at a predetermined maximum load to avoid fatigue or damage to the landing gear or other aircraft structures.

It is yet a further object of the present invention to provide a force limiting system component that releasably connects an aircraft taxi drive system to an aircraft landing gear wheel and has a mechanical shear structure with a shear point responsive to a predetermined maximum load and is engineered to break and disconnect the taxi drive system from the landing gear wheel in the presence of the predetermined maximum load.

It is yet an additional object of the present invention to provide a method for limiting landing gear wheel spin-up and other loads on landing gear to an established maximum load in aircraft with landing gear equipped with and powered by taxi drive systems mounted within the landing gear wheels.

In accordance with the aforesaid objects, a force limiting system and method are provided for limiting spin-up mass and loads in aircraft with nose or main landing gear wheels powered by taxi drive systems mounted within the landing gear wheels and that prevents operation of the taxi drive system to drive the landing gear wheels in the presence of loads beyond an established maximum load. The force limiting system and method may limit the application of spin-up loads and other loads from a taxi drive system on the aircraft landing gear with mechanical components structured to minimize taxi drive system spin-up mass that releasably connect the taxi drive system to the landing gear wheel. Mechanical components of the force limiting system are engineered to disconnect the taxi drive system from the landing gear wheel and to prevent operation of the taxi drive system to drive the landing gear wheels when predetermined maximum spin-up loads or other loads are reached during aircraft landing and during aircraft taxi.

Other objects and advantages will be apparent from the following description, drawings, and claims.

BRIEF DESCRIPTION OF THE DRAWINGS

FIG. 4A is a schematic cross-sectional view of a second embodiment of a force limiting system according to the present invention designed to releasably connect an aircraft landing gear wheel to a clutch in the taxi drive system mounted within the landing gear wheel;

FIG. 4B is a front planar view of the second embodiment of the force limiting system taken along line A-A of FIG. 4A;

FIGS. 6A and 6B are tables describing, respectively, kinematic variables and force definitions for the diagrams of FIGS. 5A and 5B.

DESCRIPTION OF THE INVENTION

Figure 1:
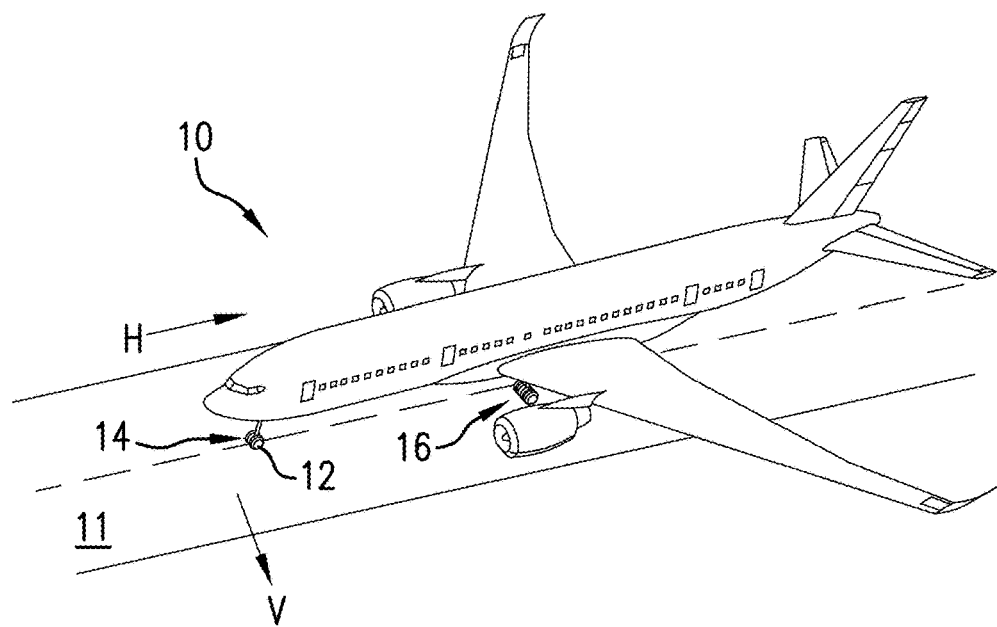
FIG. 1 shows an aircraft equipped with taxi drive systems mounted within one or more landing gear wheels and the force limiting system of the present invention landing on a runway.

When an aircraft lands on a ground surface, such as a runway, the aircraft's landing gears and the wheels and other structures supported on the landing gears are subjected to different kinds of loads and forces. When the landing aircraft contacts the runway, its speed may be in the range of 150-200 miles per hour (mph), and the aircraft's landing gear and wheels are typically subjected to vertical and horizontal loads and forces, as well as wheel spin-up and spring-back loads. The vertical forces are wheel-to-ground loads, and the horizontal forces are drag loads resulting from friction between landing gear wheel tires and the ground surface. These loads may affect landing gear wheel spin-up and spring-back loads. The FAA's method for determining wheel spin-up loads for landing conditions required for certification of landing gear structures is based on the relationship in Equation (1):

$$FH_{max} = 1/re\sqrt{2Iw(VH-V_c)nFV_{max}/tS} \qquad (1)$$

where $FH_{max}$=maximum rearward horizontal force acting on the wheel in pounds (lb)

re=effective rolling radius of wheel under impact based on a recommended operating tire pressure (which may be assumed to be equal to the rolling radius under a static load of nj $W_E$) in feet (ft)

Iw=rotational mass moment of inertia of rolling assembly in slug feet

VH=linear velocity of aircraft parallel to ground at instant of contact (assumed to be 1.2 $VS_o$) in feet per second (ft/sec)

Vc=peripheral speed of tire, if pre-rotation is used (ft/sec); there must be a positive means of pre-rotation before pre-rotation may be considered n=equals effective coefficient of friction (0.08 may be used)

$FV_{max}$=maximum vertical force on wheel in lb=nj $W_E$, where $W_E$ and nj are defined in Section 23.725* tS=time interval between ground contact and attainment of maximum vertical force on wheel in sec. (If the value of $FV_{max}$ from Equation (1) exceeds 0.8 $FV_{max}$, the latter value must be used for $FH_{max}$.)

*Section 23.725 (14 Code of Federal Regulations 23.725) describes drop test on aircraft landing gear wheels, tires, and shock absorbers and defines $W_E$ as equal to the effective weight to be used in the drop test (lb) and nj as equal to the load factor developed in the drop test, that is acceleration ($D_v/D_T$ in Gs as recorded in the drop test).

Equation (1) assumes a linear variation of load factor with time until the peak load is reached, and determines the drag force at the time that the wheel peripheral velocity at radius r e equals the aircraft velocity. Since most shock absorbers do not exhibit a linear variation of load with time, the actual variation must be compensated for. The time for wheel spin-up on most aircraft landing gears will be less than the time required to develop a maximum vertical load factor for a specified rate of descent and forward velocity.

In addition to the spin-up load, the effect of dynamic spring-back of landing gear and adjacent structure at the instant just after the aircraft's landing gear wheels come up to speed may produce dynamic forward acting loads of considerable magnitude, and this effect must be determined. Spring-back loads may be calculated by reversing the methods for determining spin-up loads. A determination of dynamic spring-back loads is likely to be critical for landing gear wheels that have a large mass or that experience high landing speeds.

Further, as noted above, aircraft manufacturers may limit other loads on aircraft landing gear and landing gear wheels that will produce damage if exceeded. Such loads may include towing loads and other forces on nose and main landing gear structures.

Referring to the drawings, FIG. 1 shows an aircraft 10 after landing on a runway 11. The aircraft 10 is equipped with a taxi drive system 12 that may be an electric taxi drive system or other taxi drive system controllable by a pilot to drive the aircraft on the ground during taxi. The taxi drive system 12 may be located in one or more of the nose landing gear wheels 14. Only one nose landing gear wheel 14 is visible in FIG. 1. Advantageously, a pilot-controlled aircraft electric taxi drive system, such as the electric taxi drive system developed by the inventors of the present invention, may be mounted completely within both of the aircraft's nose landing gear wheels. Alternatively, or additionally, a taxi drive system may be mounted completely within one or more of the aircraft's main landing gear wheels 16. The arrow H represents a horizontal force associated with drag, and the arrow V represents a vertical force associated with weight. These forces act on the aircraft 10 and also on the nose landing gear wheels 14 and the main landing gear wheels 16, as well as on other aircraft structures.

An aircraft nose or main landing gear wheel that is equipped with a taxi drive system and is powered by the taxi drive system to drive the landing gear wheel and move the aircraft during ground operations, as described below, is referred to herein as a drive wheel.

Each taxi drive system 12 may include at least a motor, which may be an electric motor, designed to generate sufficient torque to power the drive wheel within which it is mounted to move an aircraft at a range of desired speeds during ground operations, a drive system, and a torque transfer system controllable to selectively transfer the torque required to power the drive wheel through the taxi drive system and drive the aircraft on the runway 11 or on another ground surface.

Figure 2:
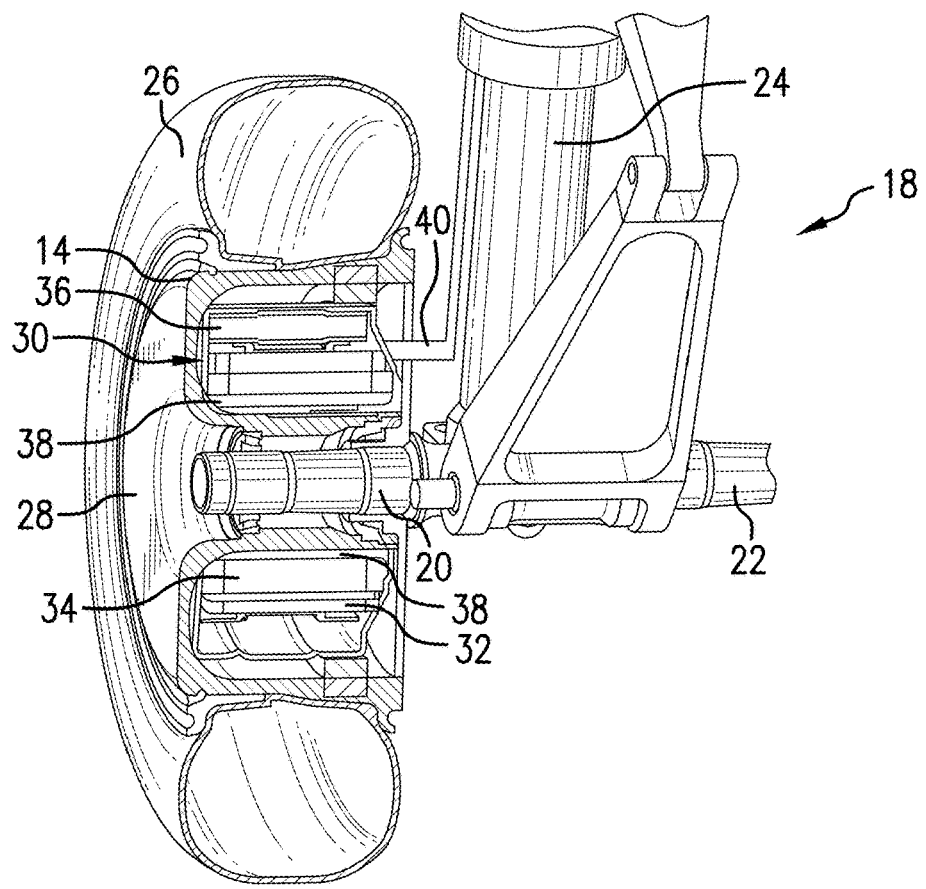
FIG. 2 is a schematic illustration of a perspective cross-sectional view of one embodiment of an electric taxi drive system useful with the present invention mounted within an aircraft nose landing gear wheel.

FIG. 2 illustrates a perspective cross-sectional view of one embodiment of a taxi drive system 12 useful with the present invention mounted completely within an aircraft nose landing gear wheel 14 that is rotatably supported on an axle 20 in an aircraft nose landing gear 18. The components of the taxi drive system are shown partially in cross-section relative to each other and to the nose landing gear wheel 14. Other arrangements and functionally equivalent taxi drive systems and taxi drive system components are also contemplated to be within the scope of the present invention.

As noted, the nose landing gear wheel 14 may rotatably mounted on an axle 20. A second nose landing gear wheel (not shown), which is a mirror image of the wheel 14, will also be similarly mounted on an axle 22, only a portion of which is shown in FIG. 2. The axle 20 may be attached to a conventional nose landing gear strut 24 at an inboard extent. The wheel 14 supports a tire 26. An outboard wheel hub section 28 may be positioned at an outboard extent of the nose landing gear wheel 14 and the axle 20. It is contemplated that all of the components of the embodiment of the taxi system 12 shown in FIG. 2 may be housed completely within the volume of the wheel 14 as shown.

In the taxi drive system embodiment shown in FIG. 2, the components are shown schematically. As noted, the taxi drive system may be an electric taxi drive system, and the taxi drive system components may include an electric drive motor 30, preferably with a rotor element 32 and a stator element 34, mounted within a portion of the wheel 14 adjacent to the axle 20. A drive system 36 may be positioned outwardly of the drive motor 30 to provide torque transfer and speed change functions. The drive system 36 may be a gear system, a roller traction drive system, or another suitable drive system. A clutch assembly 38 may be positioned within the landing gear wheel 14 to connect the wheel 14 to the drive motor 30 through the drive system 36 and transfer torque during operation of the taxi drive system. In accordance with the present invention, the clutch assembly 38 may provide a releasable connection between the wheel 14 and the taxi drive system as described below in connection with FIG. 3. The clutch assembly 38 may be activated automatically or manually to engage the drive system 36 into and out of actuation with the drive motor 30, as required. Engagement of the clutch assembly 38 enables the taxi drive system to power and drive the nose landing gear wheel 14 and move an aircraft equipped with the taxi drive system on an airport ground surface. Alternatively, disengagement of the clutch 38 may prevent actuation of the drive motor 30 and operation of the taxi drive system.

When the taxi drive system is an electric taxi drive system, as shown in FIG. 2, electric power to operate the electric drive motor 30 may be provided to the electric drive motor by a wire harness 40 or other suitable wiring connection arrangement to a source of electric power. For example, the wire harness 40 may be connected to a supply of electric power located within the aircraft, such as the aircraft's auxiliary power unit (APU), batteries, or another suitable source of electric power capable of meeting the power supply demands of an electric taxi drive system as described herein.

While a taxi drive system preferred for use with the force limiting system and method of the present invention is an electric taxi drive system as shown and described, other taxi drive systems, for example taxi drive systems with clutch assemblies that are powered by hydraulic or pneumatic drives, may also be used to limit spin-up and other loads and forces in aircraft driven on the ground by these systems.

As noted above, a low spin-up mass landing gear wheel that does not increase rotating mass or spin-up loads in a landing aircraft is highly desirable. Achieving the significant benefits possible when an aircraft is equipped with an electric or other taxi drive system may be accomplished with a taxi drive system design which ensures that the taxi drive system does not apply more force to a landing gear wheel and increase spin-up loads beyond recommended or established maximum spin-up loads for the landing gear and/or for the landing gear wheel. When a taxi drive system, such as the electric taxi drive system shown and described in connection with FIG. 2, is mounted within an aircraft landing gear wheel, the mass of the system will be added to the wheel. Minimizing the mass added by the taxi drive system so that the system does not increase spin-up loads presents challenges, which have been addressed by the present invention.

A taxi drive system useful with the present invention may incorporate a simple mechanical clutch assembly that has a small size, is light in weight compared to other clutch designs, and does not significantly increase the spin-up mass of the landing gear wheel. This clutch assembly may additionally include a simple mechanical safety feature that operates effectively to limit spin-up loads without complex electronics or software. In the event that a situation arises in which an operating landing gear wheel taxi drive system is not operating properly, the present invention may limit the force that can be applied by the taxi drive system to the landing gear wheel in which it is mounted. If, for example, the clutch assembly sticks or the taxi drive system is applying more force to the landing gear wheel than should be applied so that spin-up and/or other loads and forces are increased, force applied to the landing gear wheel may be limited. Additionally, if external loads or forces, including those that may be applied by tow vehicles, reach or exceed an established maximum for the landing gear or landing gear wheel, the force limiting system of the present invention may render the taxi drive system inoperative to move the landing gear drive wheel.

Figure 3:
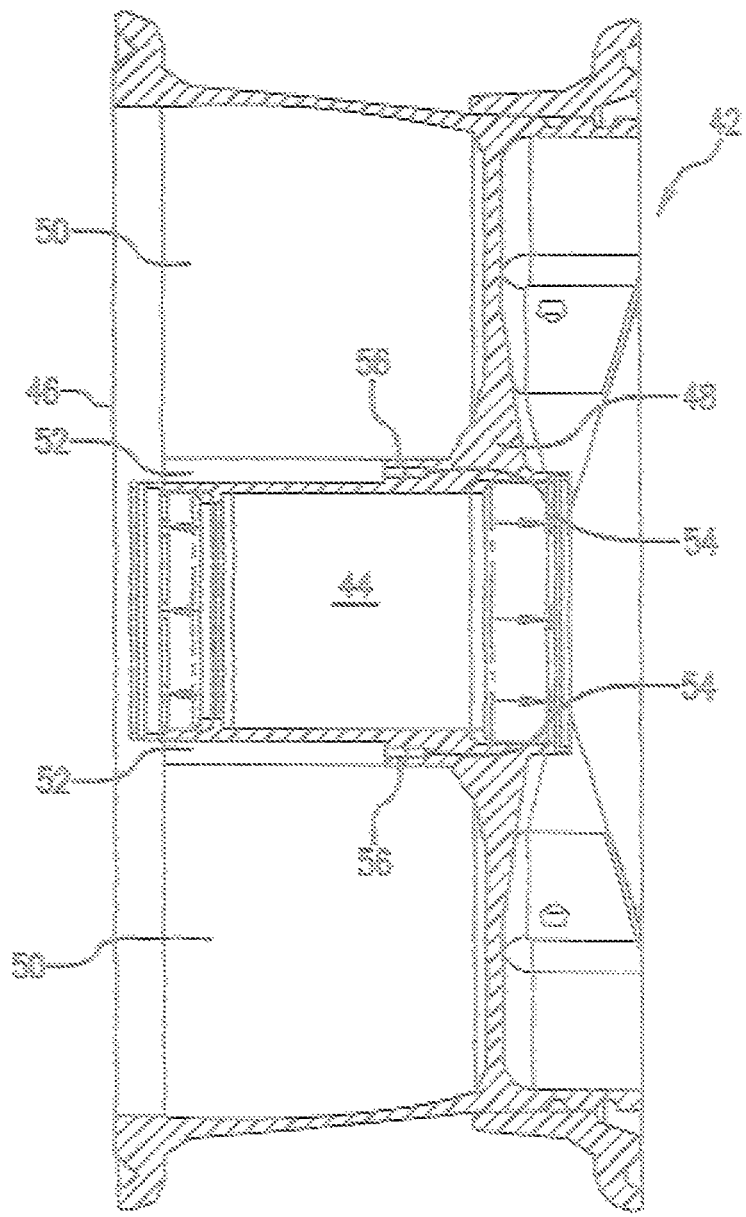
FIG. 3 is a schematic illustration of a cross-sectional view of an aircraft landing gear wheel with a taxi drive system mounted within the wheel and a first embodiment of a force limiting system designed to releasably connect the taxi drive system to the landing gear wheel.

FIG. 3 illustrates one embodiment of a force limiting system operative to limit spin-up and other loads on a landing gear wheel with a taxi drive system. An aircraft landing gear wheel 42 is schematically shown mounted on an axle 44 with the inboard side of the wheel indicated at 46 and the outboard side of the wheel indicated at 48. A tire is not mounted on the wheel 42. A taxi drive system 50, such as the electric taxi drive system described and shown in FIG. 2, may be mounted completely within boundaries of the wheel 42 between the inboard side 46 and the outboard side 48. A clutch assembly 52, represented schematically, is releasably connected to the wheel 42 by one or more releasable connectors that may be in the form of mechanical elements constructed to shear or break when the mechanical elements are subjected to a predetermined maximum load or force. The mechanical elements may be shear pins 54, two of which are shown in FIG. 3. The shear pins 54 are specifically engineered to shear or break at a breakage point, represented at 56, when the shear pins are subjected to a predetermined maximum load or force. The predetermined maximum load or force may be the recommended or established maximum spin-up load for the landing gear wheel. While only two shear pins 54 are shown, other numbers of shear pins 54 may be provided, from a single shear pin to a number of shear pins spaced circumferentially with respect to the axle 44. The shear pins 54 may be located to releasably connect the clutch 52 to the outboard wheel section 48 as shown or they may be positioned in another location (not shown) that provides a releasable connection. Structures other than pins may also be used for this purpose, for example a plurality of teeth (not shown) may be positioned circumferentially to connect the clutch assembly 52 to an inboard or to an outboard section of the wheel 42. Whatever specific structure is employed for the mechanical element, each mechanical element requires an engineered mechanical breakage point that remains intact and provides a secure connection between the wheel and the taxi drive system until a predetermined maximum force or load is applied to the engineered mechanical breakage point.

FIGS. 4A and 4B illustrate a second embodiment of a force limiting system useful in an aircraft landing gear drive wheel powered by a taxi drive system, for example the electric taxi drive system described above. This embodiment, like the embodiment shown in FIG. 3, employs a mechanical element with a breaking point or shear structure that is specifically engineered to break when a predetermined load on the mechanical element is reached, causing the landing gear wheel to be disconnected from the taxi drive system. In this embodiment, a shear plate element 58 is positioned between a clutch assembly in the taxi drive system, such as the clutch assembly 38 in FIG. 2 or the clutch assembly 52 in FIG. 3, and the landing gear wheel where the taxi drive system is mounted. As noted, this may be one or more nose and/or main landing gear wheels. The shear plate element 58 may be structured with a central shear section 60 interposed between a clutch assembly attachment section 62 and a wheel attachment section 64. The clutch assembly attachment section 62 may be attached to a taxi drive system clutch assembly (not shown) and the wheel attachment section 64 may be connected to a landing gear wheel structure 66 to form a releasable connection between the taxi drive system clutch assembly and the landing gear wheel. The central shear section 60 may include a number of circumferentially positioned shear sections 68, such as the four spaced shear sections 68 shown in FIG. 4B. Other numbers of shear sections 68 may also be positioned around the circumference of the central shear section. Each shear section 68 may be provided with a breakage or shear location 70, seen more clearly in FIG. 4A. The shear section 68 is engineered to break apart at the shear location 70 when a predetermined maximum spin-up load or other force is applied to the shear plate element 60. When the shear section 68 breaks apart or shears at the shear location 70, the clutch assembly attachment section 62 is no longer connected to the wheel attachment section 64, and the connection between the taxi drive system and the landing gear wheel is released, so that the taxi drive system can no longer drive the landing gear wheel.

The force limiting system of the present invention employs embodiments of a simple mechanical structure to releasably connect and secure a clutch assembly and a taxi drive system activated by the clutch assembly to an aircraft landing gear wheel. When a predetermined maximum spin-up load is reached by the landing gear wheel and/or the taxi drive system driving the landing gear wheel, as described above, the mechanical structure will break, releasing the taxi drive system from its connection with the landing gear wheel. The landing gear wheel may no longer be driven by the taxi drive system, and the taxi drive system is prevented from applying any loads or forces in excess of the predetermined maximum spin-up or other load, thereby limiting loads that may be applied by the taxi drive system.

The remaining drawings, FIGS. 5A and 5B and FIGS. 6A and 6B, illustrate in more detail forces on an aircraft body and an aircraft nose landing gear wheel and tire during landing and describe kinematic variables and force definitions that may be taken into account when calculating loads and forces on aircraft landing gear wheels and establishing a predetermined maximum spin-up or other load for the breaking point of a mechanical sheer pin 54, a shear section 68 on a shear plate element 58, or other like structure releasably connecting a taxi drive system clutch assembly or other component to an aircraft landing gear wheel.

Figure 5A:
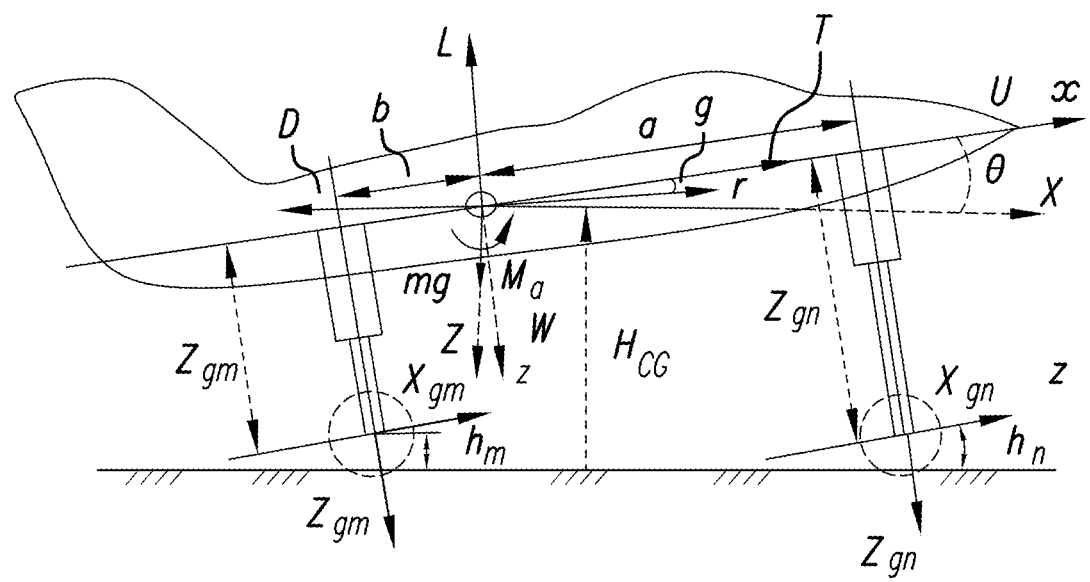
FIGS. 5A and 5B are diagrams of forces on an aircraft body and an aircraft nose landing gear wheel and tire during landing.
Figure 5B:
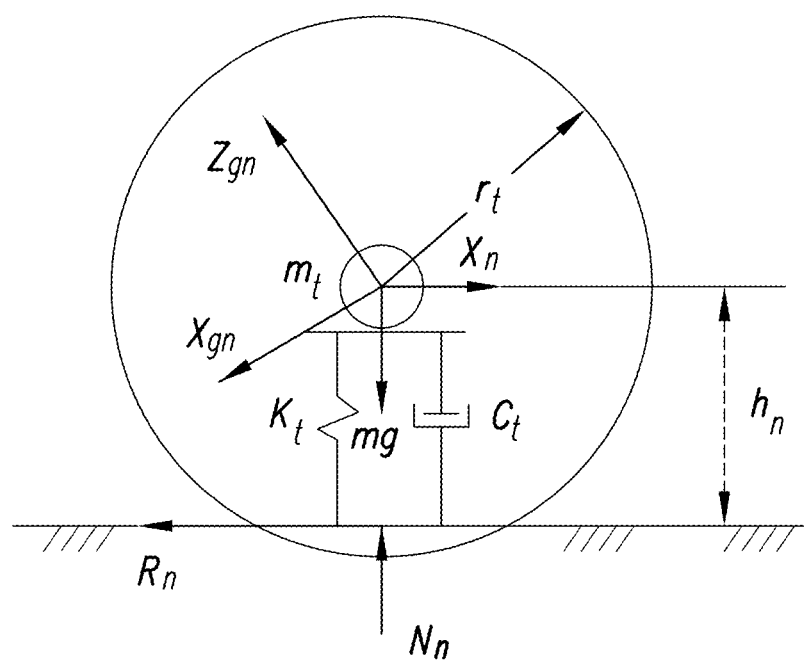

FIG. 5A is a side view of an aircraft body during the rollout phase of landing, and FIG. 5B is a diagram of the nose wheel and tire showing the forces, applied moments, and kinematic variables. FIG. 6A is a table with a set of kinematic variables describing the mechanical systems of FIGS. 5A and 5B. FIG. 6B is a table with force definitions.

It is contemplated that the present force limiting system may be effectively retrofitted into an existing aircraft nose and/or main landing gear and may also be incorporated into a landing gear design for a new aircraft to produce a landing gear with a low spin-up mass wheel.

The system and method for limiting spin-up loads in aircraft landing gears and landing gear wheels driven by taxi drive systems described herein has been described with respect to preferred embodiments. Other, equivalent, processes and structures are also contemplated to be within the scope of the present invention.

INDUSTRIAL APPLICABILITY

The force limiting system and method of the present invention will find its primary applicability in limiting spin-up loads and preventing excessive loads on aircraft landing gears and landing gear wheels where taxi drive systems are mounted to drive the landing gear wheels and move the aircraft during taxi, particularly taxi after landing.

The invention claimed is:

1. A load limiting system that limits spin-up and other loads in aircraft powered by landing gear wheel-mounted taxi drive systems and that prevents operation of the taxi drive systems to drive the landing gear wheels in the presence of loads beyond a predetermined maximum load, comprising:
    a. a taxi drive system controllable to drive an aircraft on a ground surface rotatably mounted on an axle completely within a volume formed by wheel sections of one or more nose or main landing gear wheels, said taxi drive system comprising at least a drive motor and a mechanical clutch assembly, both selected to minimize spin-up mass added to said taxi drive system; and
    b. a load limiting system releasably connecting said taxi drive system to a wheel section of said one or more nose or main landing gear wheels through said mechanical clutch assembly, comprising one or more mechanical connector elements, each having one or more shearable sections engineered to break at a breakage point in the presence of a predetermined maximum load, said one or more mechanical connector elements being attached to said mechanical clutch and structured to form a secure connection between said mechanical clutch assembly and said wheel section in the presence of a load on said shearable sections below said predetermined maximum load and to break at said breakage point to release the mechanical clutch assembly from connection with said wheel section in the presence of said predetermined maximum load on said shearable portion.

2. The system of claim 1, wherein said one or more mechanical connector elements comprise one or a plurality of shearable mechanical pin elements, and said shearable section comprises a breaking point on each said mechanical pin element engineered to shear each said mechanical pin element at a load corresponding to said predetermined maximum load.

3. The system of claim 1, wherein said one or more mechanical connector elements comprise a plurality of mechanical teeth elements connecting said clutch assembly to said wheel section, and said shearable section comprises a breaking point on each of said plurality of mechanical teeth elements engineered to sever each of said plurality of mechanical teeth elements at a load corresponding to said maximum predetermined load.

4. The system of claim 2, further comprising said one or said plurality of shearable mechanical pin elements being positioned circumferentially with respect to said axle to releasably connect said clutch assembly to an outboard wheel section.

5. The system of claim 1, wherein said load limiting system comprises a mechanical connector comprising a shear plate element interposed between and connected to each of said mechanical clutch assembly and said wheel section, wherein said shear plate element comprises a plurality of circumferentially positioned shearable sections spaced about a central shear section, each of said plurality of circumferentially positioned shearable sections having a breakage point engineered to break at a load corresponding to said predetermined maximum load and to release said clutch assembly from connection to said wheel section.

6. The system of claim 5, wherein one of said taxi drive systems is mounted completely within each said nose landing gear wheel on an aircraft nose landing gear, and a wheel section of each of said nose landing gear wheels is releasably connected to said mechanical clutch assemblies in said taxi drive systems by one of said shear plate elements.

7. The system of claim 1, wherein said taxi drive system comprises an electric taxi drive system.

8. The system of claim 1, wherein said predetermined maximum load comprises a spin-up load, a spring-back load, a drag force, or a towing or external load applied to said aircraft.

9. A method that limits spin-up and other loads in aircraft powered by landing gear wheel-mounted taxi drive systems to a predetermined maximum load without increasing spin-up mass and loads while aircraft are driven by the taxi drive systems during ground travel, comprising:
    a. providing an aircraft with taxi drive systems controllable to power the nose landing gear wheels and drive the aircraft during ground travel rotatably mounted completely within a volume created by wheel sections in each nose landing gear wheel, the taxi drive systems each comprising at least a drive motor and a mechanical clutch assembly, both selected to minimize spin-up mass added to the taxi drive system;
    b. providing a load limiting system releasably connecting the taxi drive system to a wheel section in each nose landing gear wheel through the mechanical clutch assembly comprising one or more mechanical connector elements attached to the mechanical clutch assembly, each mechanical connector element having one or more shearable sections with a breakage point engineered to break and release the mechanical clutch assembly from connection to the wheel section in the presence of a load corresponding to a predetermined maximum load on the load limiting system;
    c. connecting the mechanical clutch assembly to the wheel section with the load limiting system, forming a secure connection between the mechanical clutch assembly and the wheel section with the one or more mechanical connector elements, and maintaining the secure connection while the taxi drive system drives the aircraft during ground travel in the presence of a load on the shearable sections below the predetermined maximum load; and
    d. in the presence of a load corresponding to the predetermined maximum load applied to the shearable sections during taxi drive system-powered ground travel, breaking the breakage points on the one or more shearable sections of the one or more mechanical connector elements and releasing the mechanical clutch assembly from connection to the wheel section.

10. The method of claim 9, further comprising, wherein the one or more mechanical connector elements comprise one or a plurality of pin elements with engineered breaking points, locating the pin elements circumferentially with respect to an axle of the nose landing gear wheel, and connecting the clutch assembly to an outboard wheel section in each nose landing gear wheel with the pin elements so that the pin elements are caused to shear at the engineered breaking point when the pin elements are subjected to a load corresponding to the predetermined maximum load.

11. The method of claim 9, further comprising, wherein the one or more mechanical connector elements comprise a plate element with a plurality of circumferentially spaced shear sections each having engineered breaking points, the plate element being interposed between and attached to the mechanical clutch assembly and to the wheel section in each nose landing gear wheel, shearing the shear sections at the engineered breaking points when the shear sections are subjected to a load corresponding to the predetermined maximum load, and releasing the mechanical clutch assembly from connection with the wheel section.

12. The method of claim 9, further comprising wherein the predetermined maximum load comprises a spin-up load, subjecting the one or more mechanical connector element shearable sections to a force corresponding to the predetermined maximum spin-up load, breaking the breakage points on the one or more mechanical connector elements, causing connections between the mechanical clutch assembly and the wheel section to break, releasing the mechanical clutch assembly from connection to the wheel section, and preventing the taxi drive system from driving the aircraft.

13. The method of claim 9, further comprising in the presence of a force corresponding to a predetermined maximum load from the taxi drive system on the shearable section breakage points of the one or more mechanical connector elements causing the shearable section breakage points to break, releasing the mechanical clutch assembly from connection to an outboard wheel section, and preventing the taxi drive system from driving the aircraft.

14. The method of claim 9, further comprising engineering the breakage points of the one or more mechanical connector element shearable sections to remain intact and to provide a secure connection between the mechanical clutch assembly and the wheel section until the predetermined maximum load is applied to the breakage point, applying the predetermined maximum load to the breakage point, causing the one or more mechanical connector elements shearable sections to shear at the breakage point, and releasing the secure connection between the mechanical clutch assembly and the wheel section.

* * * * *